(12) United States Patent
Munjuluri et al.

(10) Patent No.: US 11,080,684 B2
(45) Date of Patent: Aug. 3, 2021

(54) PROCESSING DATA ON SMARTCARD

(71) Applicant: Infineon Technologies AG, Neubiberg (DE)

(72) Inventors: Bala Nagendra Raja Munjuluri, Bangalore (IN); Franz-Josef Brücklmayr, Kaufering (DE); Narasimha Kumar Vedala, Bangalore (IN); Prakash Nayak, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/563,131

(22) Filed: Dec. 8, 2014

(65) Prior Publication Data

US 2016/0162881 A1  Jun. 9, 2016

(51) Int. Cl.
| | |
|---|---|
| *G06K 19/06* | (2006.01) |
| *G06Q 20/34* | (2012.01) |
| *G07F 7/08* | (2006.01) |
| *G06Q 20/36* | (2012.01) |
| *G06F 21/62* | (2013.01) |

(52) U.S. Cl.
CPC ....... *G06Q 20/341* (2013.01); *G06F 21/6218* (2013.01); *G06Q 20/3674* (2013.01); *G06Q 20/3676* (2013.01); *G07F 7/0813* (2013.01); *G07F 7/0866* (2013.01)

(58) Field of Classification Search
CPC .............. G06Q 20/341; G06Q 20/3674; G06F 21/6218
USPC ........................ 235/492, 451, 488; 340/568.7
See application file for complete search history.

(56) References Cited

U.S. PATENT DOCUMENTS

| | | | |
|---|---|---|---|
| 6,549,912 B1* | 4/2003 | Chen .................... | G06Q 20/105 |
| 6,567,915 B1* | 5/2003 | Guthery ............... | G06Q 20/105 |
| | | | 705/17 |
| 6,834,799 B2* | 12/2004 | Tanabiki .............. | G06Q 20/105 |
| | | | 235/375 |
| 2005/0184163 A1* | 8/2005 | de Jong ............... | G06Q 20/341 |
| | | | 235/492 |
| 2011/0010516 A1* | 1/2011 | Donatiello ........... | G07F 7/1008 |
| | | | 711/163 |

* cited by examiner

*Primary Examiner* — Ahshik Kim
(74) *Attorney, Agent, or Firm* — Schiff Hardin LLP

(57) ABSTRACT

An example relates to a method for processing data an on smartcard comprising: (i) obtaining a message; (ii) searching for a rule in at least one file of the smartcard based on the message; and (iii) in case the rule was found, executing the rule.

20 Claims, 3 Drawing Sheets

PROCESSING DATA ON SMARTCARD

BACKGROUND OF THE INVENTION

Embodiments of the present invention relate to data processing on a smartcard. Modern smartcard applications require data protection mechanisms that allow for a high degree of variability.

SUMMARY

A first embodiment relates to a method for processing data on a smartcard comprising:
  obtaining a message;
  searching for a rule in at least one file of the smartcard based on the message;
  in case the rule was found, executing the rule.

A second embodiment relates to a device comprising a processing unit, wherein the processing unit is arranged for
  receiving a message;
  searching for a rule in at least one file of the device based on the message;
  in case the rule was found, executing the rule.

A third embodiment relates to a smartcard comprising
  an interface,
  a processing unit,
  a memory,
  wherein the processing unit is arranged for
    receiving a message via the interface;
    searching for a rule in at least one file stored in the memory based on the message;
    in case the rule was found, executing the rule.

A fourth embodiment is directed to a device for processing data comprising
  means for receiving a message;
  means for searching for a rule in at least one file of the device based on the message;
  means for in case the rule was found, executing the rule.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
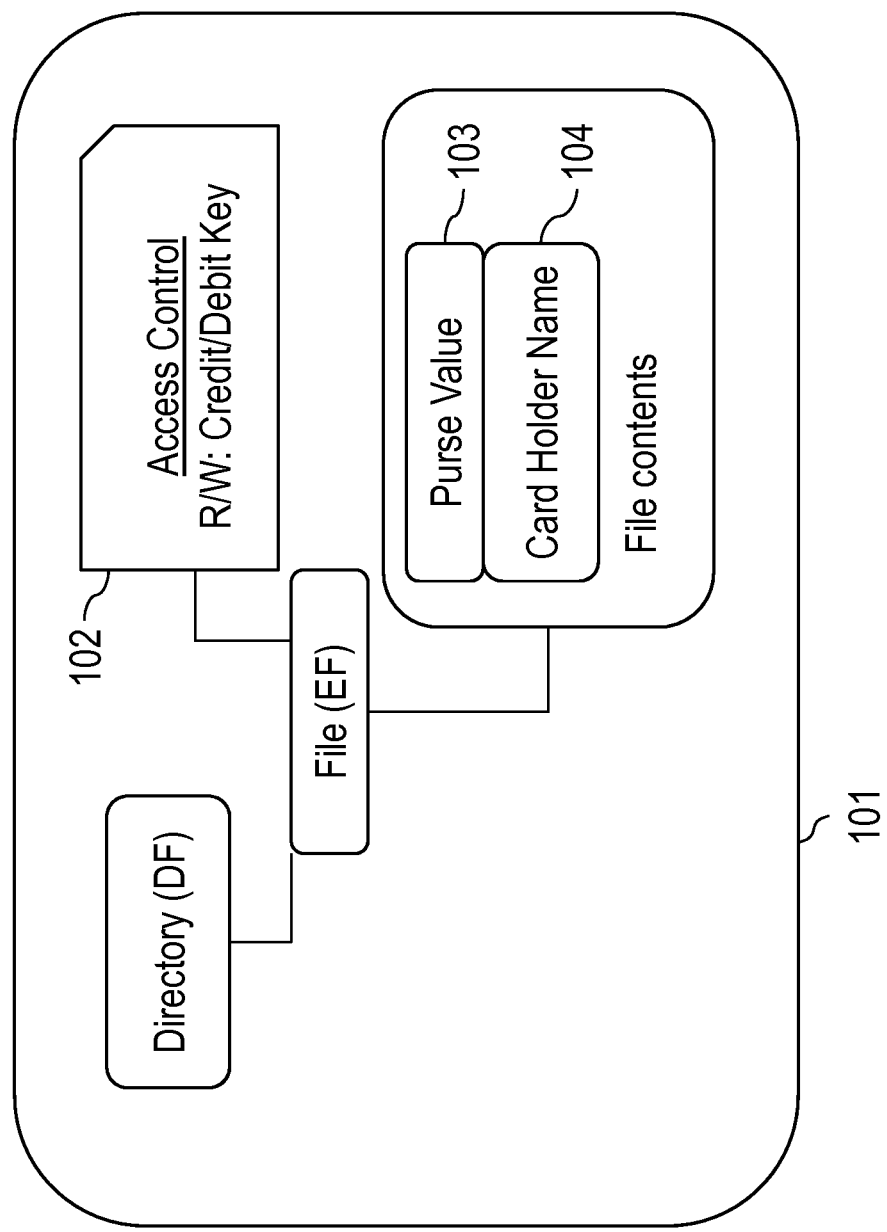
FIG. 1 shows an exemplary embodiment of a smartcard with a directory and a file, wherein an access control unit may provide access on the file level.

FIG. 1 shows an exemplary embodiment of a smartcard 101 comprising a directory DF, which comprises a file EF. An access control unit 102 may provide access on a file level. The access control unit 102 may comprise read access and/or write access for general data containers. Access conditions may define a security state required to perform an operation. A credit key or a debit key may be used to reach the security state for a credit or a debit operation. The file EF may comprise various file contents, e.g., a purse value 103 and/or a card holder name 104.

A terminal (not shown in FIG. 1) may update the purse value by using the credit and/or the debit key (depending on the type of operation, i.e. a credit operation conducted via the terminal involves the credit key and a debit operation involves the debit key).

However, if the terminal is compromised, e.g., due to software defects or due to an attack, it may conduct an unwanted update operation, e.g., credit or debit an inadmissible amount of money.

Example 1

In a first credit validation example, a credit validation rule may comprise:
  If a credit operation is performed, the purse value shall only be increased.
  The increased purse value shall be within a maximum purse limit.

Hence, in a pseudo code notation, this rule can be represented as:

```
If (new_purse_value > max_purse_limit) { //reject credit
  operation }
If (new_purse_value < existing_purse_value) { //reject credit
  operation }
wherein
  existing_purse_value    is the purse value in the smartcard,
  new_purse_value         is a purse value that is written/updated
                          by the terminal,
  max_purse_limit         is the maximum purse value (limit) that
                          can be credited.
```

Example 2

Figure 2:
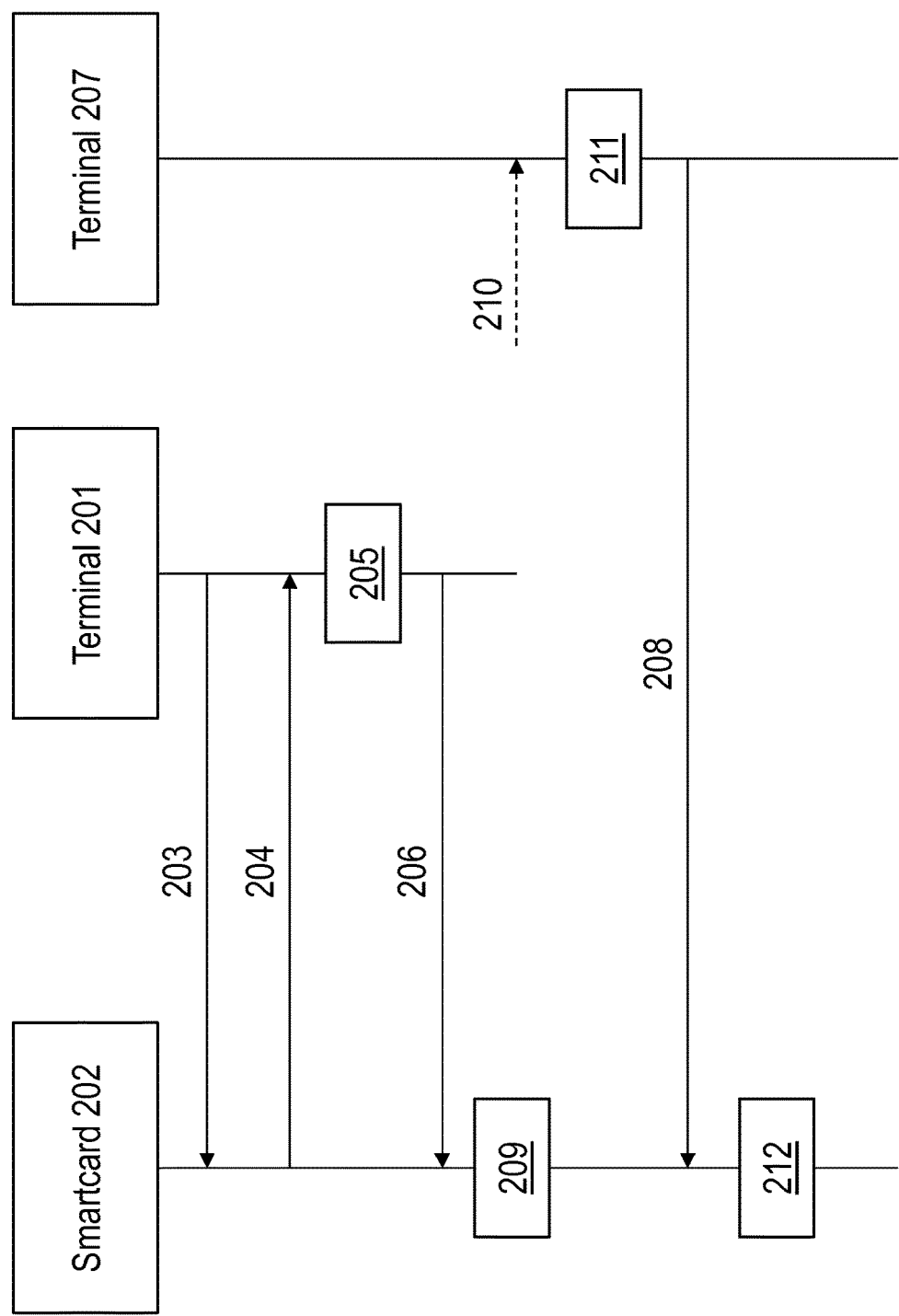
FIG. 2 shows an exemplary scenario utilizing an auto-topup feature as used in, e.g., a public transport scenario.

A so-called "auto-topup" feature is known to re-charge an account stored on a smartcard in case the balance on such smartcard falls below a certain level. FIG. 2 shows an exemplary use case utilizing the auto-topup feature as used in, e.g., a public transport scenario:

When a smartcard 202 is connected to a terminal 201, in a message 203, the terminal 201 requests the purse value from the smartcard 202. The smartcard 202 being capable of supporting the auto-topup feature, conveys the following parameters to the terminal 201 (see message 204):

```
existing_purse_value         a purse value in the smartcard,
auto_topup_threshold_value   a threshold purse value in the smartcard;
                             when the existing purse value falls
                             below this threshold, an auto
                             top-up amount must be credited,
allowed_topup_value          is the top-up amount to be credited,
auto_topup_enabled           a flag in the smartcard indicating whether
                             an auto top-up feature is available or not.
```

The terminal 201 then checks in a step 205 whether the following condition applies
  existing_purse_value<auto_topup_threshold_value?
If this is the case, the current purse value of the smartcard 202 is below the threshold and the terminal 201 will try to credit the amount determined by the allowed_topup_value on the smartcard 202. The terminal 201 will therefore, e.g., send a debit request for this amount to a bank (not shown in FIG. 2) and, after the debit process has been confirmed, set a new purse value as follows:

new_purse_value=existing_purse_value+allowed_topup_value and convey a credit message 206 with the parameter newpurse_value to the smartcard 202.

The smartcard 202 will then enter a validation process (see step 209) as described below and—in case the validation is successful—update the existing purse value:

existing_purse_value=new_purse_value.

The validation process in step 209 may comprise the following steps:

```
If ( (existing_purse_value < auto_topup_threshold_value) &&
    (auto_topup_enabled == TRUE) )
    If (new_purse_value != (existing_purse_value +
    allowed_topup_value)
        { //reject credit operation }
```

The terminal 201 may debit a maximum amount "last_debited_purse_value" on the smartcard for the ride.

After having reached a destination location via the public transport, the user of the smartcard 202 may want to check out at another terminal 207. The user connects the smartcard 202 to the terminal 207. The smartcard 202 may convey all necessary information or the terminal 207 may identify the smartcard 202 from the last connection with the terminal 201 and access (via, e.g., a centralized server) the information already provided by the smartcard 202. At the terminal 207, a price for the ride is calculated based on the locations of the (check-in) terminal 201 and the (check-out) terminal 207.

The terminal 201 may have debited an amount last_debited_purse_value from the smartcard 202, wherein

| last_debited_purse_value | is an amount debited by the check-in terminal; this value may be logged by the check-in terminal in a log file and/or stored on the smartcard. |
|---|---|

This amount may be stored, e.g., on a server or a central memory that is accessible by the various terminals.

Hence, the terminal 207 is able to determine (see step 211) whether this amount last_debited_purse_value was too high for the actual ride and the smartcard needs to be credited (back) a portion of this amount.

The terminal 207 obtains the parameters existing_purse_value and last_debited_purse_value (see arrow 210 in FIG. 2) from a server, the terminal 201 or the smartcard 202 and determines the price of the ride price="ride from terminal 201 to terminal 207".

Then, a difference to be credited is calculated as follows delta=last_debited_purse_value−price.

If the difference delta>0 the new purse value is determined new_purse_value=existing_purse_value+delta and a credit message 208 with the parameter new_purse_value is conveyed to the smartcard 202.

The smartcard 202 will then enter another validation process (see step 212) as described below and—in case the validation is successful—update the existing purse value:

existing_purse_value=new_purse_value.

The validation process in step 212 may comprise the following steps:

```
If (new_purse_value < existing_purse_value) { //reject card operation }
If (new_purse_value >= (existing_purse_value +
last_debited_purse_value)) {
//reject card operation }
```

Hence, if the auto-topup feature is enabled, the smartcard 202 in particular determines whether the new purse value is different from the existing purse value added by the allowed topup value. In case of such difference, the credit operation is rejected.

It is noted that the terminal mentioned herein may refer to any component that is capable of communicating with the smartcard. Such communication may be established via a wireless link or via a physical connection (by plugging-in the smartcard into a card reader attached to (or part of) the terminal. The terminal may comprise a processing device. The terminal may in particular be connected to at least one other terminal or processing device, in particular via a network. In an exemplary scenario, several terminals (having their own processing device) may be connected via a network to a central unit (e.g., sever). The communication between the components may be encrypted. The network may be able to reach at least one financial institute in case the smartcard needs to be charged with a certain amount of money.

Example 3

In a debit validation example, a debit validation rule with auto logging may be implemented as follows:

```
If( (new_purse_value < existing_purse_value ) &&
    (new_purse_value > (existing_purse_value −
    maximum_debit_value) )
        Record_Transaction( existing_purse_value −
        new_purse_value );
        // function that records the debited value into a log file on the
        smartcard.
    else
        { //reject card operation }
wherein
    maximum_debit_value    is a maximum amount that can be debited
                           by the check-in terminal.
```

Hence, if the new purse value (due to the debiting operation requested) is larger than the existing purse value minus the maximum amount that could be debited and if the new purse value is smaller than the existing purse value, the transaction may be conducted and the transaction may be recorded via the Record_Transaction function.

Framework Enabling the Examples 1 to 3:

The validation of the previous examples may be implemented in an application logic of the product (i.e. said smartcard).

According to an example, a framework is provided that allows dynamic configuration of advanced data protection mechanisms without necessitating updates of the smartcard's operating system (OS).

The approach presented may comprise at least one of the following steps:

(1) Rule Definition:
    A processing rule is defined utilizing rule semantics of the operating system of the smartcard.

(2) (optional:) Rule Compilation:
    The defined processing rule may be translated into an interpretable format. This may be applicable in case the format of the rule definition is different from an interpretable format of the rule.

(3) Rule Download:

The defined rule is downloaded onto the card.

(4) Rule Association:

The rule is associated to a file content.

Figure 3:
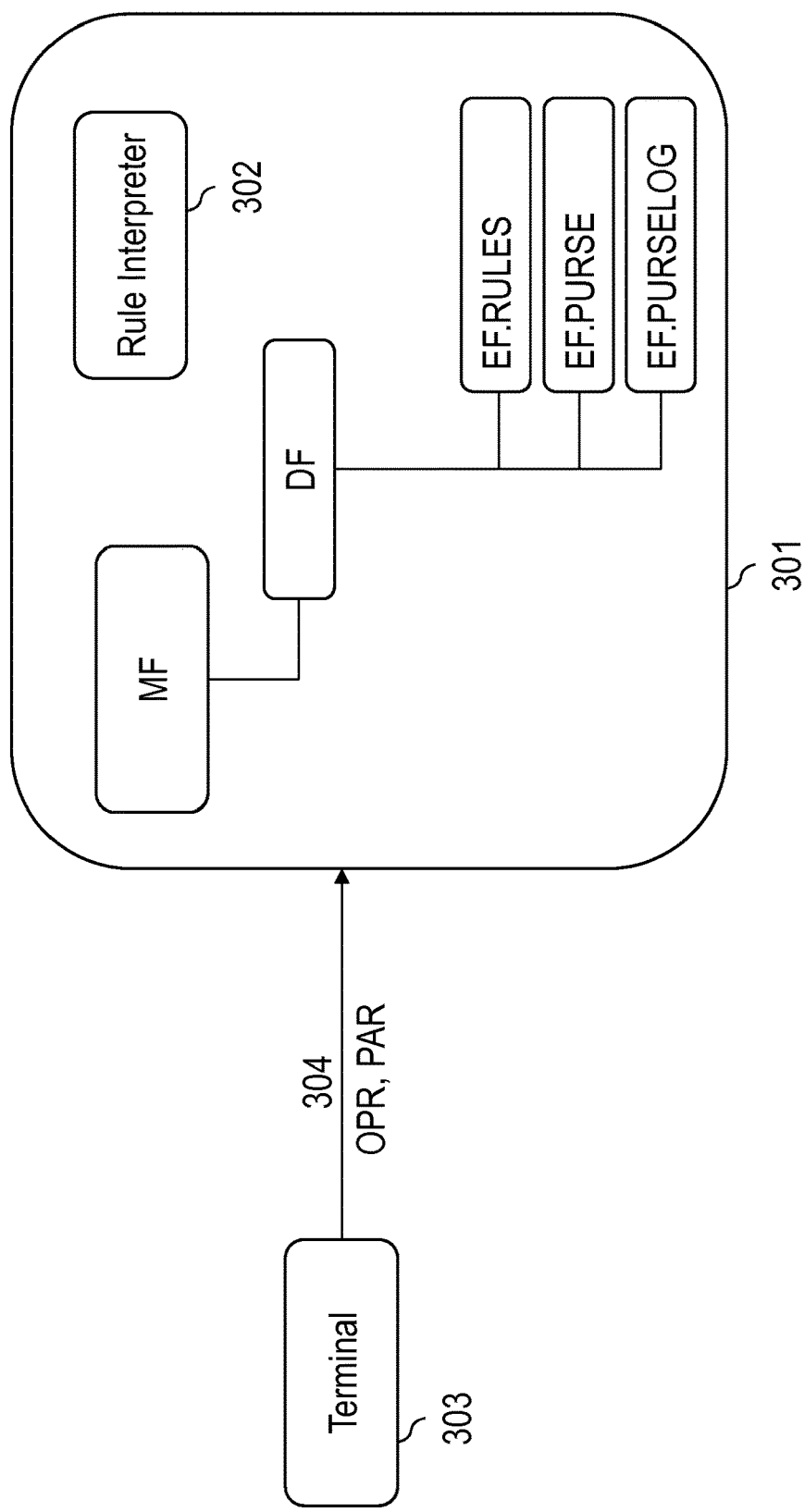
FIG. 3 shows a smartcard comprising a root directory and an application directory with a rule file EF.RULES.

FIG. 3 shows an exemplary smartcard 301 comprising a root directory MF ("master file") and an application directory DF. There may be several application directories, each for a particular application. The application directory DF comprises the following files:

- a variable-length linear record file EF.RULES;
- a fixed-length linear record file EF.PURSE; and
- a fixed-length cyclic record file EF.PURSELOG for logging purposes.

The smartcard 301 further comprises a rule interpreter 302 (which may be part of the smartcard's operating system), and a utility application programming interface (API, not shown in FIG. 3) enabling implementation of the rules.

The rule definition may be provided by the file EF.RULES. The rules may be defined utilizing an Extensible Markup Language (XML). As an option, the rules may be compiled into a machine-interpretable format, e.g., via a personal computer.

The file EF.RULES may comprise several entries, e.g., one entry per rule. It is noted that the same rules may have different entries in the file EF.RULES.

According to FIG. 3, a terminal 303 may convey a message 304 to the smartcard 301. This message may be a message according to the messages 206 or 208 shown and explained above. The smartcard 301 may then have to perform an adequate operation.

The message 304 may contain an operation OPR and none or at least one parameter PAR. The smartcard 301 determines whether a rule can be found for the operation OPR. If a rule can be found, this rule is executed and—if available—the at least one parameter PAR is forwarded to such rule. It is noted that no parameter PAR may be required and the operation OPR may indicate the rule to be executed.

If no such rule can be found, a predefined action may be conducted. For example, an error may be issued or no action at all may be conducted. The rule may lead to an update of, e.g., the existing_purse_value or an update request may be rejected by the rule.

It is an option that the message 304 also comprises a record identifier RECID that helps identifying the rule. Hence, for example, the message 304 may be one of the following:

a) OPR (PAR):

In this example, the rule can be searched for based on the operation OPR itself; once the rule is found, the at least one parameter PAR can be used by the rule.

b) OPR (RECID, PAR):

In this example, the rule can be searched for based on the record identifier RECID. The operation OPR can (but does not have to) provide an additional information that may be useful to find the rule. The operation OPR may be used by the rule to, e.g., apply the rule in a context set by the operation OPR. Once the rule is found, also the at least one parameter PAR can be used by the rule.

c) OPR only:

The rule can be determined by the operation OPR without any parameter or record identifier.

Various addressing mechanisms for the rules may apply: One example may search for a rule by considering the data conveyed via the message itself (e.g., by one of the parameters PAR of the message or by the name of the operation OPR). If a rule exists for a particular datum, e.g., the existing purse value.

The rule may comprise at least one of the following:

- a Boolean operation;
- an assignment (e.g., update) of a parameter to a local variable;
- an operation on local data stored at or made available to the smartcard.

The rule may be coded such that the rule itself is aware of the location of the data it may operate on. Hence, the local data stored on the smartcard may be accessible via the coding of the rule (addressing the data directly).

Hence, in an exemplary scenario as explained with regard to FIG. 2, the (check-out) terminal 207 may send the message 208 requesting the smartcard 202 to update its existing purse value with the new purse value. The rule interpreter on the smartcard 202 checks if there is any rule associated with the file data that is being updated and performs the appropriate checks defined by the rule. The data will then either be updated or such update will be rejected based on the outcome of the rule.

Rule-File

Hereinafter, an exemplary construction of rules in an XML notation is provided. The XML code comprises an exemplary implementation for the examples 1 to 3. The rule construction allows handling conditions that are not considered by known smartcards or operating systems. It is noted that the following XML notation is only an excerpt of the functionality to show the flexibility of the approach. The XML notation is only an example; any other representation of rules may be applicable as well.

A node <dataprocessing_rule> may define a processing node that comprises one business rule. Each processing node comprises <rule> nodes that hold the validation logic defined in terms of expressions using mathematical, logical operations and variables. A<variable> node comprises variables required in the expressions. These nodes holds data type, name, value, like the variable definitions in the C programming language.

It is noted that the comments are inserted between "<!--" and "-->" tags.

```
<?xml version="1.0"?>
<!-- all length fields are in bits -->
<data_processing_rules xmlns:dt="ifx_datatypes.xml">
<!-- The following data processing rule encodes example 1:
if(new_purse_value> max_purse_limit) { //reject credit
operation } if(new_purse_value< existing_purse_value) {
//reject credit operation } -->
<data_processing_rule id="0x01">
<rule>
<if>
<or>
<expression dt:type="logical_greater">
<lvalue dt:type="variable" name="new_purse_value"/>
<rvalue dt:type="variable" name="max_purse_limit"/>
</expression>
<expression dt:type="logical_less">
<lvalue dt:type="variable" name="new_purse_value"/>
<rvalue dt:type="variable" name="existing_purse_value"/>
</expression>
</or>
</if>
<then>
<!-- Reject smartcard operation. If required, a processing
logic for a failure condition can be provided-->
</then>
</rule>
```

```xml
<variable dt:type="short" name="existing_purse_value">
<!-- The existing purse value is extracted from a record
file whose path is defined in filepath and data location in
the file is defined by other parameters -->
<value dt:type="record_data">
<param dt:type="bytearray" name="filepath">MFID | DFID | EFID
</param>
<param dt:type="int" name="recordnumber">5</param>
<param dt:type="int" name="startbitoffset">10</param>
<param dt:type="int" name="length">16</param>
</value>
</variable>
<variable dt:type="short" name="new_purse_value">
<!-- Here, new purse value is extracted from APDU data that
is being processed in the OS; APDU data may serve as an
input/output buffer -->
<value dt:type="os_variable">
<param dt:type="enum">TAG_APDU_DATA</param>
<param dt:type="short">OFFSET</param>
</value>
</variable>
<variable dt:type="short" name="max_purse_limit">
<!-- Here maximum purse limit is extracted from a record
file whose path is defined in filepath and data location in
the file is defined by other parameters -->
<value dt:type="record_data">
<param dt:type="bytearray" name="filepath">MFID | DFID | EFID
</param>
<param dt:type="int" name="recordnumber">6</param>
<param dt:type="int" name="startbitoffset">16</param>
<param dt:type="int" name="length">16</param>
</value>
</variable>
</data_processing_rule>
<!-- The following data processing rule encodes example 2:
if( (existing_purse_value < auto_topup_threshold_value) &&
(auto_topup_enabled == TRUE)) if(new_purse_value !=
(existing_purse_value + allowed_topup_value) { //reject
credit operation } else new_purse_value<
existing_purse_value) { //reject card operation }
if(new_purse_value>= (existing_purse_value +
last_debited_purse_value)){//reject card operation} -->
<data_processing_rule id="0x02">
<rule>
<if>
<and>
<expression dt:type="logical_less">
<lvalue dt:type="variable" name="existing_purse_value"/>
<rvalue dt:type="variable" name="auto_topup_threshold_value"/>
</expression>
<expression dt:type="logical_equal">
<lvalue dt:type="variable" name="auto_topup_flag"/>
<rvalue dt:type="variable" name="auto_topup_enabled">
<value dt:type="byte">0x10</value>
</rvalue>
</expression>
</and>
</if>
<then>
<if>
<expression dt:type="logical_equal">
<lvalue dt:type="variable" name="new_purse_value"/>
<rvalue dt:type="variable" name="credit_limit_value"/>
</expression>
</if>
<else>
<!-- If required, a processing logic for a failure
condition can be provided -->
</else>
</then>
<else>
<if>
<and>
<expression dt:type="logical_less">
<lvalue dt:type="variable" name="new_purse_value"/>
<rvalue dt:type="variable" name="purse_value_before_checkin"/>
</expression>
<expression dt:type="logical_greater">
<lvalue dt:type="variable" name="new_purse_value"/>
<rvalue dt:type="variable" name="existing_purse_value"/>
</expression>
</and>
</if>
<else>
<!-- If required, a processing logic for a failure
condition can be provided -->
</else>
</else>
</rule>
<variable dt:type="short" name="new_purse_value">
<!-- Here, new purse value is extracted from APDU data that
is being processed in the OS -->
<value dt:type="os_variable">
<param dt:type="enum">TAG_APDU_DATA</param>
<param dt:type="short">OFFSET</param>
</value>
</variable>
<variable dt:type="short" name="existing_purse_value">
<!-- Here existing purse value is extracted from a record
file whose path is defined in filepath and data location in
the file is defined by other parameters -->
<value dt:type="record_data">
<param dt:type="bytearray" name="filepath">MFID | DFID | EFID
</param>
<param dt:type="int" name="recordnumber">5</param>
<param dt:type="int" name="startbitoffset">10</param>
<param dt:type="int" name="length">16</param>
</value>
</variable>
<variable dt:type="short" name="auto_topup_threshold_value">
<!-- Here threshold value is extracted from a record file
whose path is defined in filepath and data location in the
file is defined by other parameters -->
<value dt:type="record_data">
<param dt:type="bytearray" name="filepath">MFID | DFID | EFID
</param>
<param dt:type="int" name="recordnumber">4</param>
<param dt:type="int" name="startbitoffset">0</param>
<param dt:type="int" name="length">16</param>
</value>
</variable>
<variable dt:type="short" name="auto_topup_value">
<!-- Here auto topup value is extracted from a record file
whose path is defined in filepath and data location in the
file is defined by other parameters -->
<value dt:type="record_data">
<param dt:type="bytearray" name="filepath">MFID | DFID | EFID
</param>
<param dt:type="int" name="recordnumber">6</param>
<param dt:type="int" name="startbitoffset">0</param>
<param dt:type="int" name="length">16</param>
</value>
</variable>
<variable dt:type="byte" name="auto_topup_flag">
<!-- Here auto topup flag is extracted from a record file
whose path is defined in filepath and data location in the
file is defined by other parameters -->
<value dt:type="record_data">
<param dt:type="bytearray" name="filepath">MFID | DFID | EFID
</param>
<param dt:type="int" name="recordnumber">1</param>
<param dt:type="int" name="startbitoffset">24</param>
<param dt:type="int" name="length">8</param>
</value>
</variable>
<variable dt:type="short" name="credit_limit_value">
<value dt:type="expression">
<expression dt:type="math_op_addition">
<lvalue dt:type="variable" name="existing_purse_value"/>
<rvalue dt:type="variable" name="auto_topup_value"/>
</expression>
</value>
</variable>
<variable dt:type="short" name="purse_value_before_checkin">
<value dt:type="expression">
<expression dt:type="math_op_addition">
<lvalue dt:type="variable" name="existing_purse_value"/>
<rvalue dt:type="variable" name="last_debited_purse_value"/>
```

```xml
</expression>
</value>
</variable>
<variable dt:type="short" name="last_debited_purse_value">
<!-- The last debited purse value is extracted from a purse
log record file whose path is defined in filepath and data
location in the file is defined by other parameters -->
<value dt:type="record_data">
<param dt:type="bytearray" name="filepath">MFID | DFID | EFID
</param>
<param dt:type="int" name="recordnumber">1</param>
<param dt:type="int" name="startbitoffset">16</param>
<param dt:type="int" name="length">16</param>
</value>
</variable>
</data_processing_rule>
<!-- The following data processing rule encodes example 3:
If( (new_purse_value < existing_purse_value ) &&
(new_purse_value > (existing_purse_value -
maximum_debit_value) ) { //reject card operation } else
Record_Transaction(existing_purse_value - new_purse_value);
//API that records the debited value into a log file on the
smart card. -->
<data_processing_rule id="0x03">
<rule>
<if>
<and>
<expression dt:type="logical_less">
<lvalue dt:type="variable" name="new_purse_value"/>
<rvalue dt:type="variable" name="existing_purse_value"/>
</expression>
<expression dt:type="logical_greater">
<lvalue dt:type="variable" name="new_purse_value"/>
<rvalue dt:type="variable" name="diff_purse_value"/>
</expression>
</and>
</if>
<then>
<expression dt:type="exec">
<param dt:type="enum">FUNC_ID_RECORD_TRANSACTION
</param>
<param dt:type="variable" name="purse_log"/>
<param dt:type="variable" name="terminal_id"/>
<param dt:type="variable" name="debited_purse_value"/>
</expression>
</then>
<else>
<!-- If required, a processing logic for a failure
condition can be provided -->
</else>
</rule>
<variable dt:type="short" name="new_purse_value">
<!-- Here, new purse value is extracted from APDU data that
is being processed in the OS-->
<value dt:type="os_variable">
<param dt:type="enum">TAG_APDU_DATA</param>
<param dt:type="short">OFFSET</param>
</value>
</variable>
<variable dt:type="short" name="existing_purse_value">
<!-- Here existing purse value is extracted from a record
file whose path is defined in filepath and data location in
the file is defined by other parameters -->
<value dt:type="record_data">
<param dt:type="bytearray" name="filepath">MFID | DFID | EFID
</param>
<param dt:type="int" name="recordnumber">5</param>
<param dt:type="int" name="startbitoffset">10</param>
<param dt:type="int" name="length">16</param>
</value>
</variable>
<variable dt:type="short" name="diff_purse_value">
<!-- Here difference in the purse value is computed with
mathematical expression -->
<value dt:type="expression">
<expression dt:type="math_op_subtract">
<lvalue dt:type="variable" name="existing_purse_value"/>
<rvalue dt:type="variable" name="maximum_debit_value"/>
</expression>
</value>
</variable>
<variable dt:type="short" name="maximum_debit_value">
<!-- Here maximum debit value is extracted from a file
whose path is defined in filepath and data location in the
file is defined by other parameters -->
<value dt:type="transparent_data">
<param dt:type="bytearray" name="filepath">MFID | DFID | EFID
</param>
<param dt:type="int" name="startbitoffset">10</param>
<param dt:type="int" name="length">16</param>
</value>
</variable>
<variable dt:type="bytearray" name="purse_log">
<!-- Here existing purse value is extracted from a file
whose path is defined in filepath -->
<value dt:type="file_path">
<param dt:type="bytearray" name="filepath">MFID | DFID | EFID
</param>
</value>
</variable>
<variable dt:type="short" name="debited_purse_value">
<!-- Here debited purse value is computed with mathematical
expression -->
<value dt:type="expression">
<expression dt:type="math_op_subtract">
<lvalue dt:type="variable" name="existing_purse_value"/>
<rvalue dt:type="variable" name="new_purse_value"/>
</expression>
</value>
</variable>
<variable dt:type="short" name="terminal_id">
<!-- Here,terminal ID is stored by the OS during mutual
authentication. This is retrieved here-->
<value dt:type="os_variable">
<param dt:type="enum">TAG_TERMINAL_ID</param>
</value>
</variable>
</data_processing_rule>
</data_processing_rules>
```

The examples provided herein in particular suggest a generic framework to define and download advanced data protection rules that allow a smartcard to be more robust against compromised entities. This concept can be implemented in generic platform products where application developer (for example transport operators or system integrators) can define the rules specific to their requirements.

Advantageously, the examples provided here enable data protection mechanisms where access control rules depend on the data stored in the files.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for processing data an on smartcard comprising:
  obtaining a message;
  searching for a rule in at least one file of the smartcard based on the message;
  in case the rule was found, executing the rule.

Smartcard may be any embedded secure element, any chip card with a processing capability, comprising, e.g., a chip. The smartcard may comprise a wallet functionality or a ticketing functionality or the like. The smartcard may in particular support an auto-topup feature. The file may be any file structure or data object. The file may in particular any data container that can be subject to a search. The file may be any resource that can be used for storing information.

The smartcard may comprise a file structure with at least one rule file comprising a set of rules. The smartcard may also comprise an interpreter for processing incoming messages (command) and an application programming interface.

The message may be obtained via a communication between the smartcard and a terminal. The message may be conveyed via a wireless interface or via contacts of the smartcard. The message may comprise at least one criterion that allows searching for the rule in at least one file of the smartcard. In case of a successful search, the rule that matches this at least one criterion may be executed.

Hence, this approach allows defining and downloading advanced data protection rules that enable a smartcard to be more robust against compromised entities. This concept can be implemented in generic platform products where application developer (for example transport operators or system integrators) can define the rules specific to their requirements.

Advantageously, data protection mechanisms can be used where access control rules depend on the at least one file of the smartcard or where access control rules can be defined at any granularity. This introduces a high degree of flexibility in combination with high security.

In an embodiment, the method further comprises:
in case the rule was not found, conducting no action or conducting a predetermined action.

The predetermined action may comprise an error or alarm notification or the like.

In an embodiment, the message comprises at least one of the following:
an identifier for the rule;
an indication towards an operation to be conducted;
at least one parameter.

Any of the above can be used to find the rule in the at least one file. Also any of the above can be used to execute the rule. The identifier may be any means that allows determining the rule to be found. Also, the indication towards an operation, e.g., a name of the operation "update", "credit", "debit", etc. can be used to find the corresponding rule in the at least one file of the smartcard. Also, the parameter(s) of the message may be used to determine the rule: for example, a number of parameters may be used to determine the rule. Also, combinations of the above may be used to find the corresponding rule.

It is noted that it is also an option that several rules in the at least one file of the smartcard may be successful hits based on the search triggered by the message. It is in particular an option to execute more than one rule from those hits.

In an embodiment, the method comprises the step:
in case the rule was found, executing the rule based on at least one of the following:
the identifier for the rule;
the indication towards an operation to be conducted;
the least one parameter.

Hence, the information conveyed in the message, e.g., the at least one parameter, can be used for processing the rule. This may correspond to a function call with at least one parameter conveyed by the call, wherein the function itself may utilize this parameter. An example is a message requesting an update of a purse value to an amount of Z. This amount Z is a parameter conveyed in the message that is used by the rule (if such rule is found) to check whether such update can be allowed.

In an embodiment, executing the rule comprises accessing data that are locally stored on the smartcard.

Hence, the rule itself may be aware of the location of the local data of the smartcard. Locally stored data may refer to data that are accessible on the smartcard itself.

In an embodiment, the at least one file comprises several rules that are defined in a notation that can be compiled into a machine-interpretable format.

For example, a notation may be chosen as rule file(s) that may be compiled (translated) into a format that is interpretable for the smartcard (i.e. an interpreted provided on the smartcard). It is also an option that the rules may already be defined in an interpretable format; in this case, no compilation of the rule file(s) is required.

As an example, XML can be used to define rules of the rule file(s).

In an embodiment, the at least one file only comprises rules for the smartcard.

There may be at least one file (also referred to as rule file) that comprises at least one rule (definition). Combining the rules in at least one rule file bears the advantage that rules can be efficiently updated by updating this at least one rule file.

In an embodiment, the method comprises the step: updating the at least one file by at least partially replacing it.

Hence, the rules can be efficiently updated by replacing or updating the file that contains the rules. Updating may in this regard also create the at least one file (if it does not exist before).

In an embodiment, the rule comprises at least one of the following:
a Boolean operation;
an assignment (e.g., update) of a parameter to a local variable;
an operation on local data stored at or made available to the smartcard.

In an embodiment, the method further comprises:
until all rules are searched in the at least one file of the smartcard:
searching for the rule based on the message;
in case the rule was found, executing the rule.

Hence, the at least one file may contain several rules that meet the search criterion defined by the message. Accordingly, several rules found can be executed.

In an embodiment, the message is provided by a terminal via an interface between the terminal and the smartcard.

Such interface can be a wireless interface utilizing, e.g., near-field communication, or the smartcard and the terminal may be connected via electronic contacts of the smartcard. It is noted that the terminal may be a component capable of communicating with the smartcard. The terminal may be connected, e.g., via a network, to other terminals and/or to at least one other processing device, e.g., server.

Further, a device is provided comprising a processing unit, wherein the processing unit is arranged for
receiving a message;
searching for a rule in at least one file of the device based on the message;
in case the rule was found, executing the rule.

It is noted that the steps of the method stated herein may be executable on the device, in particular said processing unit, as well.

It is further noted that said processing unit can comprise at least one, in particular several means that are arranged to execute the steps of the method described herein. The means may be logically or physically separated; in particular several logically separate means could be combined in at least one physical unit. Said processing unit may comprise at least one of the following: a processor, a microcontroller, a hard-wired circuit, an ASIC, an FPGA, a logic device.

In an embodiment, the device is a smartcard.

The processing unit of such smartcard may comprise at least one component, e.g., chip for processing the steps described herein.

In an embodiment, the message comprises at least one of the following:
- an identifier for the rule;
- an indication towards an operation to be conducted;
- at least one parameter.

In an embodiment, the processing unit is arranged for
in case the rule was found, executing the rule based on at least one of the following:
- the identifier for the rule;
- the indication towards an operation to be conducted;
- the least one parameter.

Further, a smartcard is provided, comprising
an interface,
a processing unit,
a memory,
wherein the processing unit is arranged for
receiving a message via the interface;
searching for a rule in at least one file stored in the memory based on the message;
in case the rule was found, executing the rule.

In addition, a device for processing data is provided, such device comprising
means for receiving a message;
means for searching for a rule in at least one file of the device based on the message;
means for in case the rule was found, executing the rule.

Also, a computer program product is suggested, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing data on a smartcard, comprising:
    obtaining a message;
    searching for, based on the message, a smartcard data protection rule configured to control access to or to control modification of the data; and
    in case the smartcard data protection rule is found, executing the smartcard data protection rule,
    wherein the smartcard data protection rule is updatable by downloading to the smartcard an update of the smartcard data protection rule or a new smartcard data protection rule into a memory section of a smartcard application, the application previously configured on the smartcard, and associating the updated or new smartcard data protection rule with the data.

2. The method according to claim 1, further comprising:
    in case the smartcard data protection rule was not found, conducting no action or conducting a predetermined action.

3. The method according to claim 1, wherein the message comprises
    an identifier for the smartcard data protection rule,
    an indication towards an operation to be conducted, or
    a parameter.

4. The method according to claim 3, further comprising:
    in case the smartcard data protection rule was found, executing the smartcard data protection rule based on
    the identifier for the smartcard data protection rule,
    the identification towards an operation to be conducted, or
    a parameter.

5. The method according to claim 1, wherein executing the smartcard data protection rule comprises accessing data that are locally stored on the smartcard.

6. The method according to claim 1, wherein the smartcard data protection rule is stored in a file in the memory section, which stores a plurality of rules that are defined in a notation that can be compiled into a machine-interpretable format.

7. The method according to claim 1, wherein the smartcard data protection rule is stored in a file that is configured to store only rules for the smartcard.

8. The method according to claim 7, further comprising: updating the file by at least partially replacing it.

9. The method according to claim 1, wherein the smartcard data protection rule comprises a Boolean operation, an assignment of a parameter to a local variable, or an operation on local data stored at or made available to the smartcard.

10. The method according to claim 1, further comprising:
    searching all the rules in the smartcard or until the smartcard data protection rule is found.

11. The method according to claim 1, wherein the message is provided by a terminal via an interface between the terminal and the smartcard.

12. The method according to claim 1, wherein the smartcard data protection rule is updated after initial personalization.

13. A smartcard comprising a processor, wherein the processor is arranged for:
    receiving a message;
    searching for, based on the message, a smartcard data protection rule configured to control access to or to control modification of data on the smartcard; and
    in case the smartcard data protection rule was found, executing the smartcard data protection rule,
    wherein the smartcard data protection rule is updatable by downloading to the smartcard an update of the smartcard data protection rule or a new smartcard data protection rule into a memory section of a smartcard application, the application previously configured on the smartcard, and associating the updated or new smartcard data protection rule with the data.

14. The smartcard according to claim 13, wherein the message comprises
    an identifier for the smartcard data protection rule
    an indication towards an operation to be conducted, or
    a parameter.

15. The smartcard according to claim 14, wherein the processor is arranged for:
    in case the smartcard data protection rule was found, executing the smartcard data protection rule based on
    the identifier for the smartcard data protection rule
    the indication towards an operation to be conducted, or
    the parameter.

16. The smartcard according to claim 13, wherein the smartcard data protection rule is updated after initial personalization.

17. A smartcard, comprising:
    an interface; and
    a processor arranged for:
        receiving a message;
        searching for, based on the message, a smartcard data protection rule configured to control access to or to control modification of data on the smartcard; and
        in case the smartcard data protection rule was found, executing the smartcard data protection rule,
    wherein the smartcard data protection rule is updatable by downloading to the smartcard an update of the smartcard data protection rule or a new smartcard data protection rule into a memory section of a smartcard application, the application previously configured on the smartcard, and associating the updated or new smartcard data protection rule with the data.

18. The smartcard according to claim 17, wherein the smartcard data protection rule is updated after initial personalization.

19. A smartcard for processing data, comprising:
    means for receiving a message;
    means for searching for, based on the message, a smartcard data protection rule configured to control access to or to control modification of data on the smartcard; and
    means for, in case the smartcard data protection rule was found, executing the smartcard data protection rule,
    wherein the smartcard data protection rule is updatable by downloading to the smartcard an update of the smartcard data protection rule or a new smartcard data protection rule into a memory section of a smartcard application, the application previously configured on the smartcard, and associating the updated or new smartcard data protection rule with the data.

20. The smartcard according to claim 19, wherein the smartcard data protection rule is updated after initial personalization.

* * * * *